US007821515B2

(12) United States Patent
Goddeau

(10) Patent No.: US 7,821,515 B2
(45) Date of Patent: Oct. 26, 2010

(54) METHOD FOR AUTOMATIC FONT CHARACTER HEIGHT RESTRICTION

(75) Inventor: Barbara J. Goddeau, Wakefield, MA (US)

(73) Assignee: Monotype Imaging Inc., Woburn, MA (US)

( * ) Notice: Subject to any disclaimer, the term of this patent is extended or adjusted under 35 U.S.C. 154(b) by 790 days.

(21) Appl. No.: 11/819,377

(22) Filed: Jun. 27, 2007

(65) Prior Publication Data

US 2009/0002375 A1 Jan. 1, 2009

(51) Int. Cl.
*G06T 11/00* (2006.01)
*G09G 5/00* (2006.01)

(52) U.S. Cl. ....................... 345/472; 345/467; 345/660; 345/665

(58) Field of Classification Search ................. 345/660, 345/670, 467, 469, 469.1, 472, 472.1, 471
See application file for complete search history.

(56) References Cited

U.S. PATENT DOCUMENTS 4,517,604 A * 5/1985 Lasher et al. ............... 382/233
6,927,773 B2 * 8/2005 Momozono et al. ......... 345/467
2004/0227771 A1 11/2004 Arnold et al.
2005/0062758 A1 3/2005 Kaasila et al.
2005/0219248 A1 10/2005 Arnold et al.
2006/0017733 A1 * 1/2006 Matskewich et al. ........ 345/467

OTHER PUBLICATIONS

Cho, Peter Sungil, "Computational Models for Expressive Dimensional Typography," Masters Degree Thesis submitted to the School of Architecture and Planning, Massachusetts Institute of Technology, Jun. 1999, pp. 1-84.

* cited by examiner

*Primary Examiner*—Michelle K Lay
(74) *Attorney, Agent, or Firm*—Fish & Richardson P.C.

(57) ABSTRACT

A method is provided for reducing a height of a font character in a nonlinear scaling process. The method includes reducing the height of the character by interacting with hinting instruction to adjust relevant instructions to thereby reduce the overall height of a font character while preserving as much of the integrity of the character as possible. The method includes an iterative process which selectively removes various pixels, defining an outline of a font character while maintaining a removal criteria, which results in a nonlinear height reduction in order to produce a font of a desired height.

11 Claims, 3 Drawing Sheets

PRIOR ART

METHOD FOR AUTOMATIC FONT CHARACTER HEIGHT RESTRICTION

FIELD OF THE INVENTION

The present invention relates to a method for rendering font characters and, in particular, a method for reducing the height of a font character when rendering.

BACKGROUND OF THE INVENTION

The appearance and layout of a typical text document, e.g., a word processing document or a media presentation document, is determined by the selection of fonts used to display the characters which comprise the text document. To accurately render a text document, often it is necessary to vary the size or resolution of the font, depending on the display or printer used to view the contents of the document.

Mathematical algorithms are used to scale font characters and render the font characters at various sizes and resolutions. One mathematical scheme used to render font characters at various sizes and resolutions while maintaining character aesthetics is referred to as hinting. Hinting corrects the pixels of a font character scaled to a given size and resolution using any number of techniques for restoring the native shape, aesthetics and legibility of the character. Hinting consists of making minor corrections to the outline of a font character to preserve the "spirit" of a typeface throughout all of its characters or glyphs for all font sizes.

One type or family of fonts, which are mathematically scalable, are TrueType fonts. Other scalable fonts include PostScript, TrueType or OpenType font. In TrueType fonts, each glyph or character form contains a respective hint data program, such as a script or algorithm, which includes instructions for manipulating various control points of the respective glyph outline just prior to rasterization. As a result, the outline of the glyph is mathematically altered by the respective glyph's hinting instruction to surround only the pixels that produce a desired bitmap image of the glyph.

Typically, the outline and hint data are executed using a hint instruction processing program which interprets hint instructions that are embedded within each character in a TrueType font set. The hinting program is typically written in C programming language, which recognizes on the order of 256 hinting instructions. Many of these instructions move two dimensional coordinates of a point either horizontally, vertically or in a diagonal direction, called the "freedom vector." Some instructions calculate the distance between points. Some interpolate collections of points between two moved points. The TrueType hint program inspects each hint instruction in the glyph and performs the operation specified by the hint instruction. PostScript uses a similar hint interpreter and hinting scheme.

Often it is necessary to adjust the height of text to fit within a fixed space. However, sometimes the characters which comprise the text are too tall to fit within a fixed space and, therefore, the characters need to be adjusted in a vertical or y direction. This could be achieved by scaling the characters linearly in the y direction. One disadvantage with using linear scaling is that depending on the character and the extent to which the character height is to be reduced, the scaling produces characters which are distorted or do not appear correctly. Moreover, linear scaling may produce characters which affect readability.

SUMMARY OF THE INVENTION

The present invention involves a novel method for automatically reducing the height of a character by using an iterative process and a pixel removal criteria, whereby pixels are removed during the iterative process from selected portions of the character while maintaining a preset minimum pixel spacing relative to various on pixels, e.g., black spaces, and off pixels, e.g., white spaces, which comprise a bitmap of the font characters by using a predetermined removal criteria. As a result of the present method, font characters are reduced in a non-linear process, whereby the readability and recognition of the characters are maintained while simultaneously reducing an overall height of the font characters. Thus, the present method preserves as much of the integrity of the font characters as possible while reducing its overall height.

The present method, in one form, reduces the height of a character by adapting hinting technology used in rendering a font character. The method uses the hint instructions and adds adjustments at key or relevant hinting instructions to reduce the overall height of a font character while preserving the font character integrity as much as possible.

For example, for TrueType fonts, the present method may be implemented by making two passes in executing the TrueType instructions. During a first pass, information pertaining to instruction which affects the y component of a point is stored as the instruction is executed. Instructions altering any components of the points which comprise an outline of a font character are identified as "key instructions." A new y position for each of the points comprising the character outline is determined so that the outline does not exceed the present boundaries for the character. An adjustment value is set for each instruction and then the instructions are executed a second time, now applying the adjustment value for each relevant instruction.

With regard to identifying new y positions, the y positions are identified by using an iterative process, in order to remove pixels, e.g., black or white spaces from various portions of a bitmap which comprises the font character until a desired font height is achieved, while maintaining a removal criteria. The removal criteria maintains a predefined spacing between off or white pixels and on or black pixels comprising a bitmap of the font, thereby allowing the height of the font to be disproportionately or nonlinearly scaled to achieve the desired height reduction while maintaining as much of the integrity of the font character as possible.

The present invention, in one form, comprises executing font character instructions for rendering a font character to produce a font outline; determining points which comprise an outline for a font character to be rendered based on the font character instruction; calculating new y positions for various points which comprise the outline so that the outline does not exceed preset boundaries for the character, calculating a new y position using a pixel removal criteria in which pixels are removed in an iterative process until a desired font height is achieved, the removal criteria comprising: maintaining at least one off pixel between zones, defined as areas in the font character separated by a horizontal stripe of off pixels, and at least three on pixels between two points when removing pixels during the iterative process, if possible, and, if not possible; eliminating the one off pixel between zones, and reducing the number of on pixels between points in succession, from three to two to one, during the iterative process;

setting an adjustment value for each instruction; and executing the font instruction while applying the adjustment value to each point.

The present invention, in another form, comprises executing font character instructions for rendering a font character to produce a font outline; determining an outline for a font character to be rendered based on the font character instruction; determining whether a y component of a character outline is to be adjusted and, therefore, the freedom vector in the y direction is not zero; storing instruction code, a point number, and, optionally, a parent number, if there is a parent number for a respective point number, and any other point number, if the point number is an interpolation; storing the x and y coordinate values of each point, a respective part number to which the instruction belongs, and a status value, indicating whether or not the instruction applies to a single character part or to a composite character; identifying key points from the outline of the character corresponding to points having instructions applied thereto, to adjust their respective position; constructing a data structure comprising a set of trees where roots of the tree correspond to points which do not have parents, and each parent has a branch for each of its children; identifying a set of zones as areas in a bitmap of the character separated by a horizontal stripe of off pixels within the character; defining a y line by data added to the typeface, which sets a baseline point which does not move; calculating a number of pixels needed to be removed from above or below the baseline; removing pixels, one at a time, in an iterative process, until the number of pixels to be removed is reached, the iterative process comprising: removing off pixels between zones comprising the font, until the number of pixels to be removed is reached, or until there is only one off pixel separating one zone from another zone; if there is only one zone; shifting the character towards the baseline if there is only one zone in the character bitmap, and the character lies entirely above or below the baseline; removing an on pixel between composite parts which comprise the character, if any; removing an on pixel from the topmost or bottommost portion of the character; removing an on pixel between the instruction trees previously constructed; removing a pixel from the largest on pixel portion of the character; wherein removing pixels occurs based on removal criteria setting an amount of off pixels between regions and an amount of on pixels between points; setting an adjustment value for each instruction; and executing the font instruction while applying the adjustment value to each point.

DETAILED DESCRIPTION

Figure 1A:
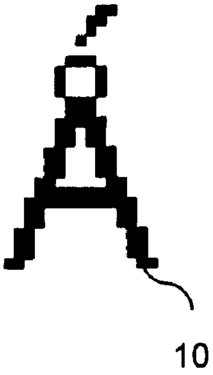
FIG. 1A is a bitmap of a font character prior to height reduction.
Figure 1B:
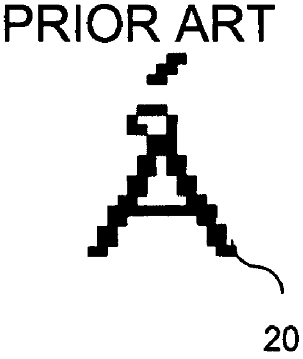
FIG. 1B is the character of FIG. 1A having its height linearly scaled using a prior art height restriction method.
Figure 1C:
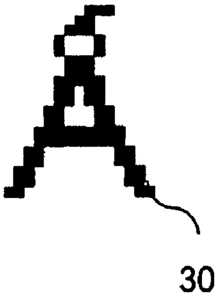
FIG. 1C is the character of FIG. 1A having its height reduced in accordance with the present method.

Referring now to FIGS. 1A-1C, font character 10 is depicted in FIG. 1A as an original height font character. FIG. 1B depicts character 20, which represents the character 10 reduced, using a prior art height reduction method in which the height of character 10 is linearly scaled. FIG. 1C depicts character 30, which represents character 10 reduced in height, in accordance with the present automatic height reduction method.

A comparison of original character 10 with the reduced height character 30 in accordance with the present invention, and the linearly scaled font character 20, exemplifies the result of using the present automatic height restriction method over the prior linear scaling height restriction method. The automatic height restricted character 30 maintains the integrity of character 10, while simultaneously reducing its height to the same extent as linearly scaled character 20. Moreover, the automatic height restriction character 30 maintains the appearance and integrity of the original character 10. Conversely, character 20 is distorted.

Figure 2A:
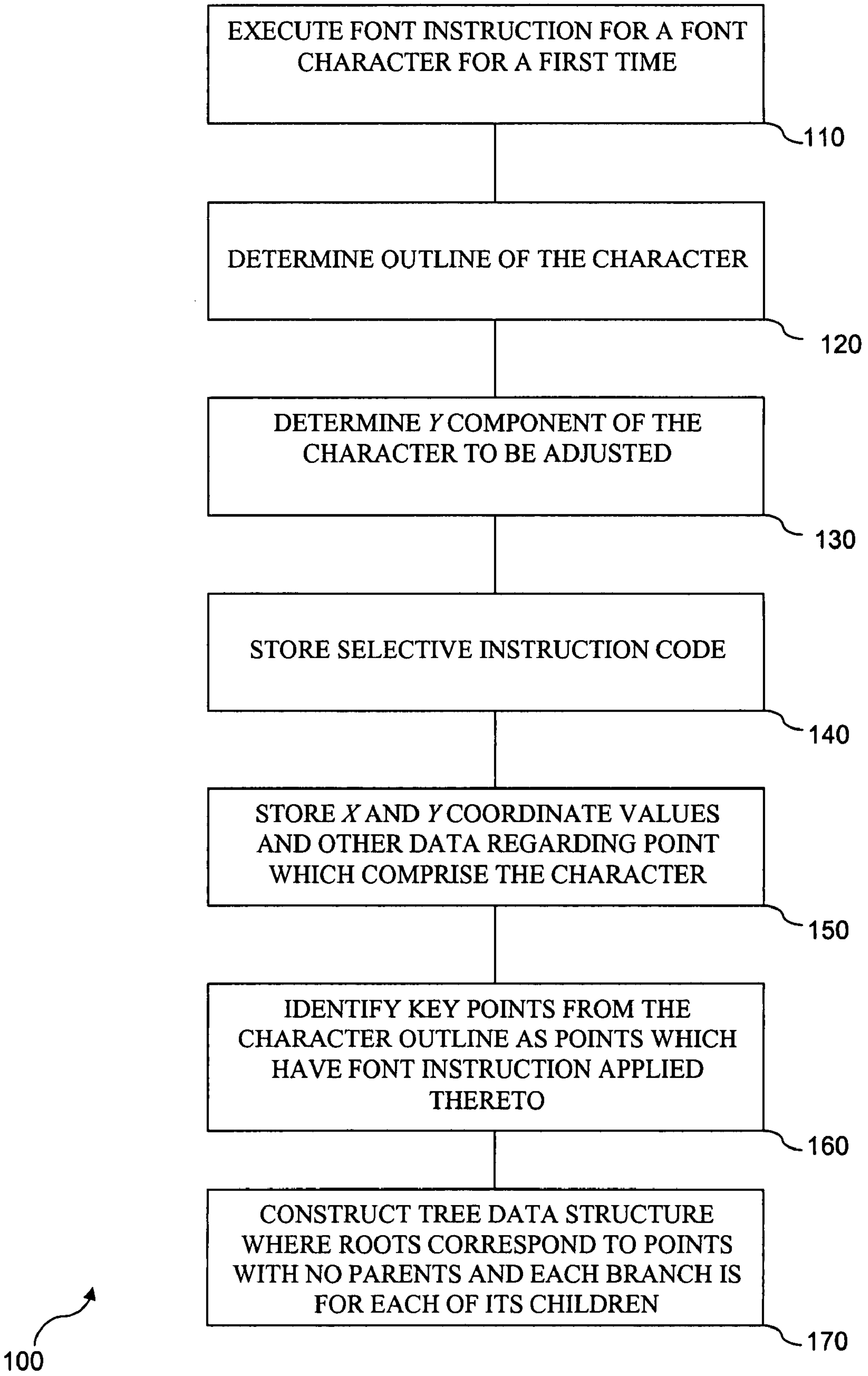
FIGS. 2A and 2B depict a flowchart of a method for reducing a font character height in accordance with the present invention.
Figure 2B:
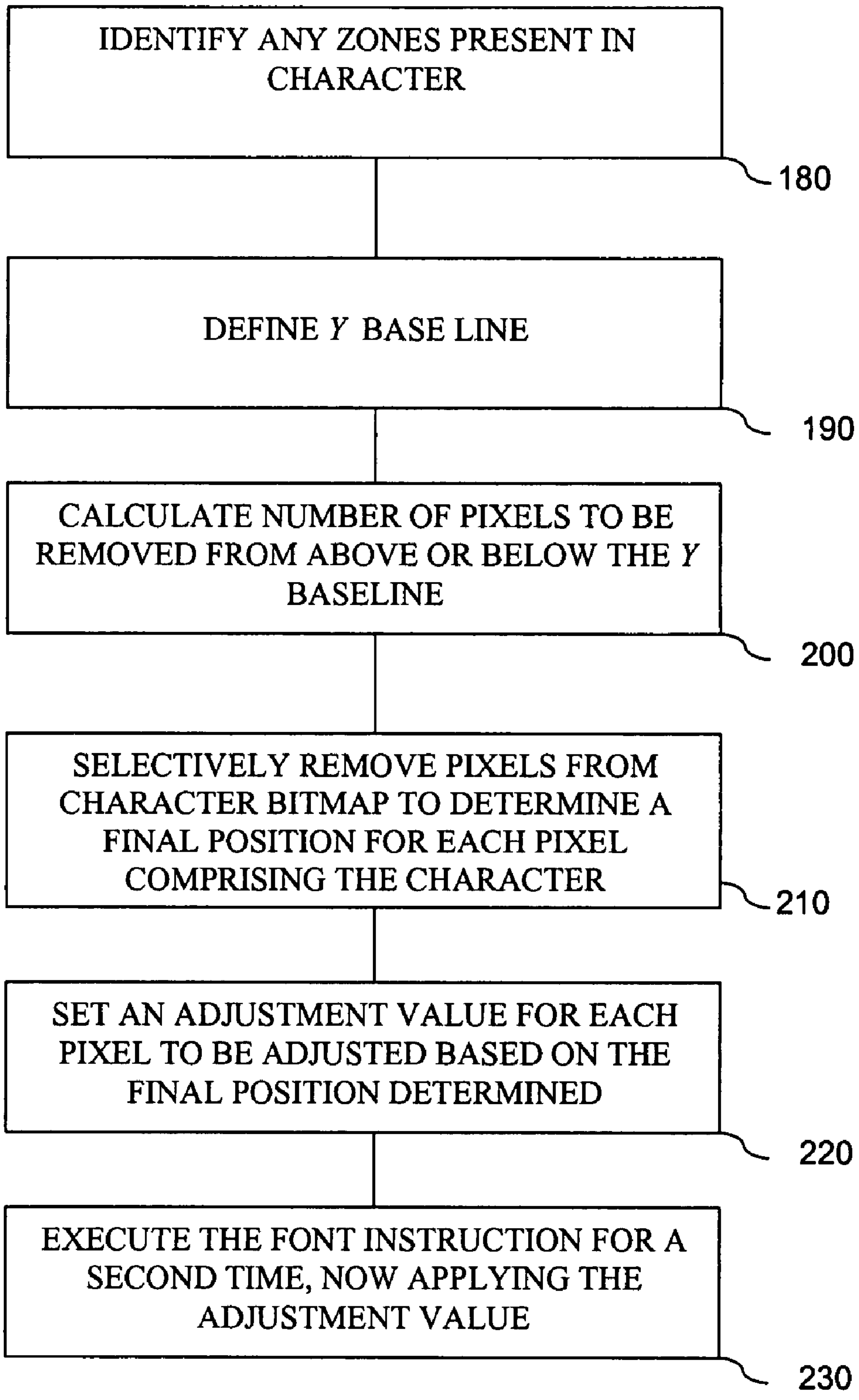

Referring now to FIGS. 2A and 2B, automatic height restriction method 100 comprises executing font character instruction for rendering a font character to thereby produce a character outline (step 110). For example, the font character instruction may be from TrueType font instructions or other scalable font instructions. The instructions are used to determine an outline of a font character to be rendered, including the points which comprise the outline of the character to be rendered (step 120).

Based on the font character instructions, it is determined whether a y component of each point of the character outline is to be adjusted during font rendering (step 130). For example, if the font instruction is for a scalable TrueType font, the freedom vector in the y direction will not be zero for any y component for a point which is to be adjusted.

After determining a y component for each point to be adjusted, instruction code, a point number, a parent point number (if there is a parent for the point), and other parent point number (if there is an interpolation) are stored for a subsequent execution during a second execution of the font instruction during step 230, as discussed below (step 140).

As used herein, a point number is the index of the point on the outline, i.e., the number is simply an identifier of a point on the outline. The parent point number is the index or identifier of the parent of the point. Interpolated points have two parents, the coordinate of the interpolated point is computed by interpolating the point between the two parent points. Interpolated points do not produce point numbers.

X and y coordinate values are stored for each point of the character, in addition to respective part numbers to which the instruction belongs (step 150). In addition, a status value, indicating whether or not the instruction applies to a single character part or to a composite character, is also stored (step 150).

True Type fonts contain two types of characters, simple characters and composite characters. Simple characters contain the outline and the hints for the particular character. Composite characters are created by combining one or more simple characters into one character. The individual characters which make up the composite characters are called parts. Each part is identified by a part number which is the index to that part in a list of parts which comprise the composite character.

Key points are identified from the outline of the character, corresponding to points having instructions applied thereto, to adjust their respective positions during font rendering (step 160). When the font instruction is a TrueType font instruction, the key points are ones which have instructions applied to them, such as Move Indirect Absolute Point (MIAP), Move Direct Absolute Point (MDAP), Move Indirect Relative Point (MIRP), Move Direct Relative Point (MDRP), SHift Point (SHP), SHift Contour (SHC), SHift by PIXel amount (SHPIX) and DELTA (step 160).

A data structure is constructed comprising a set of trees where roots of the trees correspond to points which have no parents and where each parent has a branch for each of its children (step 170).

In one form, the data structure created comprises a set of trees comprising roots corresponding to points which do not have parents, since the instruction to be applied to the points are Move Indirect Relative Points (MIRP) or Move Direct Absolute Points (MDAP) (step 170).

Next, the font character is examined to determine whether the character comprises zones, defined as on pixels separated by a horizontal strip of off pixels spanning across the entire width of the character (step 180). If the character does contain zones, a set of zones are so identified (step 180).

Next, a y line is defined, setting a baseline point which does not move (step 190). The y-line value is added to data which comprises the typeface data.

Optionally, two additional y lines may be defined (step 190). The additional y lines identify a second reference line and a minimum or maximum value to which the lines can be moved. The additional y lines prevent upper case characters which have accent marks from appearing smaller than lower case accents. The additional y lines are also specified by data added to the typeface data.

Next, a number of pixels needed to be removed from above or below the baseline, in order to reduce the character to a desired height, is calculated (step 200).

Subsequently, points or pixels are removed, one at a time, in an iterative process from the bitmap of the character while maintaining a removal criteria (step 210). The removal criteria includes first maintaining at least one off or white point or space between zones if zones are present in the character, and at least three on or black pixels or spaces between two points when removing pixels during the iterative process (discussed below), if at all possible. If not, the removal criteria eliminates the one off or white pixel between zones and reduces the number of on or black pixels or spaces between two points, in succession, from three to two to one, during the iterative process (step 210).

The iterative process, applying the removal criteria, removes one pixel at a time in succession, as follows. First, an off pixel between zones is removed. If there is only one zone and the character lies entirely above or below the baseline, the character is shifted toward the baseline. Next, a pixel is removed between composite parts, if any are present.

Next, an on or black pixel is removed from the topmost or bottommost portion of the font outline, followed by the removal of a pixel from between the instruction trees that were computed in step 170. Finally, a pixel is removed from the largest on pixel or black space comprising the font character. The iterative process is allowed to proceed until the desired height of the font is achieved, thereby producing all final y positions for each of the points being computed (step 210).

Using the final y positions, an adjustment value is computed for each point to be adjusted in the reduced height character (step 220). Instructions for points which do not have parents act to determine the amounts to move the respective points. Conversely, instructions for points which do have parents need to be adjusted in order to factor in the amount that the parent will be shifted, which in turn determines how much that point needs to be shifted (step 230). Accordingly, for pixels with parents, it is determined how much the point needs to be shifted, factoring that the parent point will itself be shifted (step 230).

It will now be clear to one of ordinary skill in the art that the present automatic height restriction method provides features and advantages not found in prior linearly scaled height restriction methods. The present method produces a font non-linearly reduced in height, which maintains the integrity of the font character, while reducing its height as desired. Furthermore, the present method preserves the overall appearance and integrity of a character as much as possible while reducing its height.

Although the invention has been described above in relation to preferred embodiments thereof, it will be understood by those skilled in the art that variations and modifications can be effected in these preferred embodiments without departing from the scope and spirit of the invention.

It is claimed:

1. A method for reducing a height of a font character, said method comprising:

executing font character instructions for rendering a font character to produce a font outline;

determining points which comprise an outline for a font character to be rendered based on the font character instruction;

calculating, in a processor, new y positions for various points which comprise the outline so that the outline does not exceed preset boundaries for the character, said calculating a new y position using a pixel removal criteria in which pixels are removed in an iterative process until a predetermined font height is achieved, said removal criteria comprising:

a. maintaining at least one off pixel between zones, said zones being defined as areas in the font character separated by a horizontal stripe of off pixels, and at least three on pixels between two points when removing pixels during the iterative process, if possible, and, if not possible;

b. eliminating the one off pixel between zones, and reducing the number of on pixels between points in succession, from three to two to one, during the iterative process;

setting an adjustment value for each instruction; and executing the font instruction while applying the adjustment value to each point.

2. The method of claim 1, wherein said iterative process comprises:

i. removing an off pixel between zones comprising the font until the number of pixels to be removed is reached, or until there is only one off pixel separating one zone from another zone;

ii. if there is only one zone, shifting the character towards the baseline if there is only one zone in the character bitmap, and the character lies entirely above or below the baseline;

iii. removing an on pixel between composite parts which comprise the character, if any;

iv. removing an on pixel from the topmost or bottommost portion of the character;

v. removing an on pixel between the instruction trees previously constructed; and vi. removing a pixel from the largest on pixel portion of the character, wherein pixels are only removed while maintaining the removal criteria.

3. The method of claim 1, wherein the appearance of the character is maintained with minimal distortion.

4. A method for reducing a height of a font character, said method comprising:

executing font character instructions for rendering a font character to produce a font outline;

determining an outline for a font character to be rendered based on the font character instruction;

determining whether a y component of a character outline is to be adjusted and, therefore, the freedom vector in they direction is not zero;

storing instruction code, a point number, and, optionally, a parent number, if there is a parent number for a respective point number, and any other point number, if the point number is an interpolation;

storing the x and y coordinate values of each point, a respective part number to which the instruction belongs, and a status value, indicating whether or not the instruction applies to a single character part or to a composite character;

identifying key points from the outline of the character corresponding to points having instructions applied thereto, to adjust their respective position;

constructing a data structure comprising a set of trees where roots of a tree correspond to points which do not have parents, and each parent has a branch for each of its children;

identifying a set of zones as areas in a bitmap of the character separated by a horizontal stripe of off pixels within the character;

defining a y line by data added to the typeface, which sets a baseline point which does not move;

calculating, in a processor, a number of pixels needed to be removed from above or below the baseline; removing pixels, one at a time, in an iterative process, until the number of pixels to be removed is reached, said iterative process comprising:

i. removing off pixels between zones comprising the font, until the number of pixels to be removed is reached, or until there is only one off pixel separating one zone from another zone;

ii. if there is only one zone; shifting the character towards the baseline if there is only one zone in the character bitmap, and the character lies entirely above or below the baseline;

iii. removing an on pixel between composite parts which comprise the character, if any;

iv. removing an on pixel from the topmost or bottommost portion of the character;

v. removing an on pixel between the instruction trees previously constructed;

vi. removing a pixel from the largest on pixel portion of the character;

wherein removing pixels occurs based on removal criteria setting an amount of off pixels between regions and an amount of on pixels between points;

setting an adjustment value for each instruction; and executing the font instruction while applying the adjustment value to each point.

5. The method of claim 4, wherein the key point instructions are selected as points having instructions applied thereto selected from the group consisting of MIAP, MDAP, MIRP, MIRP, MDRP, SHP, SHC, SHPIX and DELTA.

6. The method of claim 4, wherein the pixel removal criteria comprises first removing pixels in the iterative process from i-vi, while maintaining at least one off pixel between zones, and at least three on pixels between two points, if possible, and, if not possible, eliminating the one off pixel between zones, and reducing the number of on pixels between points in succession, from three to two to one, during the iterative process.

7. The method of claim 4, further comprising defining a second y-line and a third y-line, said second y-line corresponding to a second reference line and a minimum or maximum value to which the second y-line can be moved.

8. The method of claim 7, wherein the second y-line and the third y-line are specified by data added to the typeface.

9. The method of claim 4, wherein said setting an adjustment value comprises computing an amount each instruction needs to be adjusted based on the pixels removed during the iterative process.

10. The method of claim 9, wherein instruction for pixels with no parents move the pixels by the amount computed, and for instructions for pixels with parents, determining how much a point needs to be shifted, factoring that the parent point will be shifted.

11. The method of claim 4, wherein constructing a data structure comprises a set of trees comprising roots corresponding to points which do not have parents, since the instruction to be applied to the points are move indirect relative point (MIRP) or move direct absolute point (MDAP).

* * * * *

UNITED STATES PATENT AND TRADEMARK OFFICE

CERTIFICATE OF CORRECTION

PATENT NO. : 7,821,515 B2
APPLICATION NO. : 11/819377
DATED : October 26, 2010
INVENTOR(S) : Barbara J. Goddeau It is certified that error appears in the above-identified patent and that said Letters Patent is hereby corrected as shown below:

In Column 7, Line 5, in Claim 4, delete “they” and insert -- the y --

In Column 8, Line 14-15, in Claim 5, delete “MIRP, MIRP,” and insert -- MIRP, --

Signed and Sealed this
Eleventh Day of January, 2011

David J. Kappos
*Director of the United States Patent and Trademark Office*